US012738983B2

(12) United States Patent
Liu et al.

(10) Patent No.: US 12,738,983 B2
(45) Date of Patent: Sep. 15, 2026

(54) RIS CAPABILITY REPORTING

(71) Applicant: Lenovo (Beijing) Limited, Beijing (CN)

(72) Inventors: Bingchao Liu, Beijing (CN); Chenxi Zhu, Fairfax, VA (US); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 353 days.

(21) Appl. No.: 18/687,433

(22) PCT Filed: Sep. 10, 2021

(86) PCT No.: PCT/CN2021/117641
§ 371 (c)(1),
(2) Date: Feb. 28, 2024

(87) PCT Pub. No.: WO2023/035219
PCT Pub. Date: Mar. 16, 2023

(65) Prior Publication Data
US 2025/0132785 A1 Apr. 24, 2025

(51) Int. Cl.
*H04B 7/04* (2017.01)
*H04B 7/06* (2006.01)

(52) U.S. Cl.
CPC ....... *H04B 7/04013* (2023.05); *H04B 7/0634* (2013.01)

(58) Field of Classification Search
CPC .............. H04B 7/04013; H04B 7/0634; H04B 7/15528
See application file for complete search history.

(56) References Cited

U.S. PATENT DOCUMENTS 11,528,657 B1 * 12/2022 Mangalvedhe .... H04B 7/04013
12,445,171 B2 * 10/2025 Elshafie ............. H01Q 15/0006
2015/0229032 A1 * 8/2015 Liu .......................... H01Q 3/12 343/766
2021/0126359 A1 4/2021 Kim et al.
(Continued)

FOREIGN PATENT DOCUMENTS

CN 110839204 A 2/2020
CN 111163515 A 5/2020
(Continued)

OTHER PUBLICATIONS

"Extended European Search Report", EP Application No. 21956402.8, Apr. 28, 2025, 6 pages.
(Continued)

*Primary Examiner* — Jinsong Hu
*Assistant Examiner* — Rui M Hu
(74) *Attorney, Agent, or Firm* — FIG. 1 Patents

(57) ABSTRACT

Methods and apparatuses for RIS capability reporting are disclosed. A method at an RIS device comprises transmitting RIS capability including at least the number of elements in a vertical direction ($N_x$) and the number of elements in a horizontal direction ($N_y$), and whether the phase states of all elements in each column can be controlled together; and receiving a reflection coefficients matrix derived based on the RIS capability.

16 Claims, 6 Drawing Sheets

(56) References Cited

U.S. PATENT DOCUMENTS

2022/0059943 A1* 2/2022 Saab .................... H04B 7/0617
2022/0077919 A1* 3/2022 Li ...................... H04B 7/04013
2022/0123803 A1* 4/2022 Rimalapudi ........... H04B 7/061
2022/0216908 A1* 7/2022 Choi .................. H04B 7/04013
2022/0399652 A1* 12/2022 Herrero ................ H01Q 15/148
2022/0407222 A1* 12/2022 Zhu ........................ H01Q 3/005
2023/0077482 A1* 3/2023 Shahvirdi Dizaj Yekan ............... H01Q 3/46 343/770
2023/0176174 A1* 6/2023 Penna ................... G01S 5/0036 342/451
2023/0180094 A1* 6/2023 Gurelli ............... H04B 7/04013 370/336
2023/0208486 A1* 6/2023 Dai ...................... H04B 7/0617 370/315
2023/0246674 A1* 8/2023 Åström .................. H04B 7/145 375/262
2023/0292277 A1* 9/2023 Dou ...................... H04L 5/0053
2023/0308200 A1* 9/2023 Dai .................... H04B 17/3913
2023/0318177 A1* 10/2023 Zhou ........................ H01Q 3/46 455/456.1
2023/0421412 A1* 12/2023 Zegrar ................... H04B 7/086
2024/0048188 A1* 2/2024 Elshafie ............. H04B 7/04026
2024/0120967 A1* 4/2024 Elshafie ............. H04B 7/04013
2024/0128999 A1* 4/2024 Haustein ............ H04B 7/04013
2024/0137074 A1* 4/2024 Chen .................. H04B 7/04013
2024/0137077 A1* 4/2024 Elshafie ............. H01Q 15/0006
2024/0154648 A1* 5/2024 Elshafie ............. H04B 7/04026
2024/0154657 A1* 5/2024 Elshafie ............. H04B 7/04013
2024/0171222 A1* 5/2024 Capolino ........... H01Q 15/0066
2024/0171447 A1* 5/2024 Hemadeh ................ H04L 27/36
2024/0187041 A1* 6/2024 Elshafie ............. H04B 7/06952
2024/0305335 A1* 9/2024 Elshafie ............. H01Q 15/0013
2025/0096852 A1* 3/2025 Tong .................. H04B 7/06952

FOREIGN PATENT DOCUMENTS

CN 112888059 A 6/2021
CN 112910807 A 6/2021
CN 113078932 A 7/2021
CN 113098575 A 7/2021

OTHER PUBLICATIONS

Jung, et al., "On the Optimality of Reconfigurable Intelligent Surfaces (RISs): Passive Beamforming, Modulation, and Resource Allocation", IEEE Transactions on Wireless Communications, vol. 20, No. 7, Jul. 2021, Jul. 2021, 17 pages.
PCT/CN2021/117641 , "International Preliminary Report on Patentability", International Application No. PCT/CN2021/117641, Mar. 5, 2024, 4 pages.
PCT/CN2021/117641 , "International Search Report and Written Opinion", International Application No. PCT/CN2021/117641, May 26, 2022, 7 pages.
Peng , et al., "Multiuser Full-Duplex Two-Way Communications via Intelligent 1-14 Reflecting Surface", IEEE Transactions on Signal Processing, Jan. 8, 2021, 17 pages.

* cited by examiner

RIS CAPABILITY REPORTING

FIELD

The subject matter disclosed herein generally relates to wireless communications, and more particularly relates to methods and apparatuses for RIS capability reporting.

BACKGROUND

The following abbreviations are herewith defined, at least some of which are referred to within the following description: New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), User Equipment (UE), Evolved Node B (eNB), Next Generation Node B (gNB), Uplink (UL), Downlink (DL), Central Processing Unit (CPU), Graphics Processing Unit (GPU), Field Programmable Gate Array (FPGA), Orthogonal Frequency Division Multiplexing (OFDM), Radio Resource Control (RRC), User Entity/Equipment (Mobile Terminal), Transmitter (TX), Receiver (RX), Reconfigurable Intelligent Surface (RIS), Large Intelligent Surface (LIS), Intelligent Reflecting Surface (IRS), line of sight (LOS), Non Line of Sight (NLOS), positive-intrinsic-negative (PIN).

Reconfigurable Intelligent Surface (RIS), which can be alternatively referred to as Large Intelligent Surface (LIS), Intelligent Reflecting Surface (IRS) or Intelligent Metasurface, is an emerging technology. RIS is a large and thin metasurface of metallic or dielectric material, comprised of an array of passive sub-wavelength scattering elements with specially designed physical structure. The elements can be controlled in a software-defined manner to change the electromagnetic (EM) properties (e.g. phase shift) of the reflection of the incident radio frequency (RF) signals. By a joint phase control of all scattering elements, the reflected radiation pattern of the incident RF signals can be arbitrarily tuned in real time, thus creating new degrees of freedom to the optimization of the overall wireless network performance. RIS can real-time control the response of electromagnetic wave effectively, and is considered as one of the potential key technologies for 6G systems.

High frequency band (e.g., terahertz band) may cause some issues for 5G NR and even 6G, including extra blockage loss, smaller coverage radius and high energy consumption. RIS may construct radio environment by deploying a programmable surface, by which a strong NLOS path is constructed when LOS path is blocked. RIS can work similarly to a relay to extend coverage radius. The typical scenario of RIS is coverage enhancement, including blind spot coverage enhancement and radius enhancement as illustrated in FIG. 1. One typical RIS deployment is that the control signals, e.g., the reflection coefficients related information of the RIS are calculated at the base station and then sent to the RIS's controller through a dedicated feedback link. Different RIS types and different RIS structures may be adopted especially for different frequency bands. For example, diode-based structure maybe adopted in lower frequency band while meta-atom based structure maybe adopted in higher frequency band. Different RIS structures and different RIS parameters correspond to different reflection coefficient information. It is necessary to enable the RIS to report the RIS capability (i.e. RIS parameters) to the base station for reflection coefficients calculation.

This invention targets sending the RIS capability or RIS parameters to the base station based on different RIS structures.

BRIEF SUMMARY

Methods and apparatuses for RIS capability reporting are disclosed.

In one embodiment, a method at an RIS device comprises transmitting RIS capability including at least the number of elements in a vertical direction ($N_x$) and the number of elements in a horizontal direction ($N_y$), and whether the phase states of all elements in each column can be controlled together; and receiving a reflection coefficients matrix derived based on the RIS capability.

In one embodiment, when the phase states of all elements in each column can be controlled together, the reflection coefficients matrix has a size of $N_y \times 1$, and when the phase states of all elements in each column can be controlled independently, the reflection coefficients matrix has a size of $N_y \times N_x$.

In another embodiment, the RIS capability may further include the number of phase states of each element (M); and each reflection coefficient in the reflection coefficients matrix has N bit(s), where $N=\log_2(M)$. In addition, the RIS capability may further include the number of RIS panels, and each RIS panel has the same structure In still another embodiment, the RIS capability may further include whether dual meta-atom types are adopted. In particular, when the dual meta-atom types are adopted, the RIS capability further includes the initial phase of each meta-atom type before phase change, and a meta-atom pattern.

In one embodiment, a method at a base station comprises receiving RIS capability including at least the number of elements in a vertical direction ($N_x$) and the number of elements in a horizontal direction ($N_y$), and whether the phase states of all elements in each column can be controlled together; deriving a reflection coefficients matrix based on the RIS capability; and transmitting the reflection coefficients matrix.

In another embodiment, an RIS device comprises a transmitter that transmits RIS capability including at least the number of elements in a vertical direction ($N_x$) and the number of elements in a horizontal direction ($N_y$), and whether the phase states of all elements in each column can be controlled together; and a receiver that receives a reflection coefficients matrix derived based on the RIS capability.

In yet another embodiment, a base station comprises a receiver that receives RIS capability including at least the number of elements in a vertical direction ($N_x$) and the number of elements in a horizontal direction ($N_y$), and whether the phase states of all elements in each column can be controlled together; a processor that derives a reflection coefficients matrix based on the RIS capability; and a transmitter that transmits the reflection coefficients matrix.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
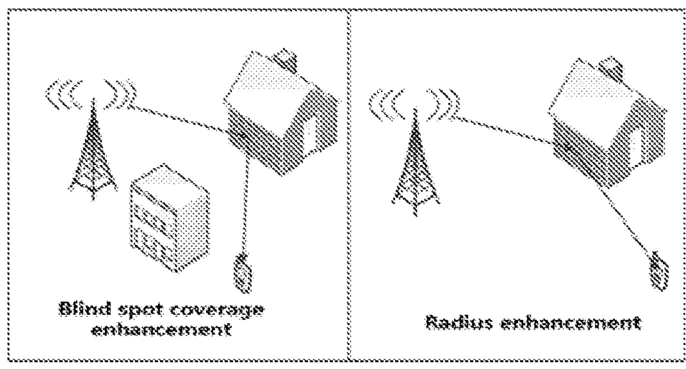
FIG. 1 illustrates some typical scenarios of RIS development.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

As described in the background part, an RIS contains a RIS array which is composed of N elements, where each element can be controlled to have different states (e.g. ON state and OFF state). The base station can transmit a reflection coefficients matrix to the RIS, where the reflection coefficients matrix includes the reflection coefficient of each element of the RIS.

The RIS may have different RIS structures. The base station needs to know the RIS structure so that the reflection coefficient of each element of the RIS can be exactly derived.

A first embodiment relates to different RIS structures.

A first RIS structure is composed of N electrically controlled RIS reflective elements. Each reflective element can adjust the phase shift by leveraging positive-intrinsic-negative (PIN) diodes. A PIN diode can be switched between "ON" state and "OFF" state, based on which the metal plate can add a different phase shift to the reflected signal. It means that each element of the RIS can be configured to phase state 0 or phase state 1 by apply different reflection coefficients, i.e., the reflection coefficient of each RIS element can be set to 0 or 1.

Figure 2:
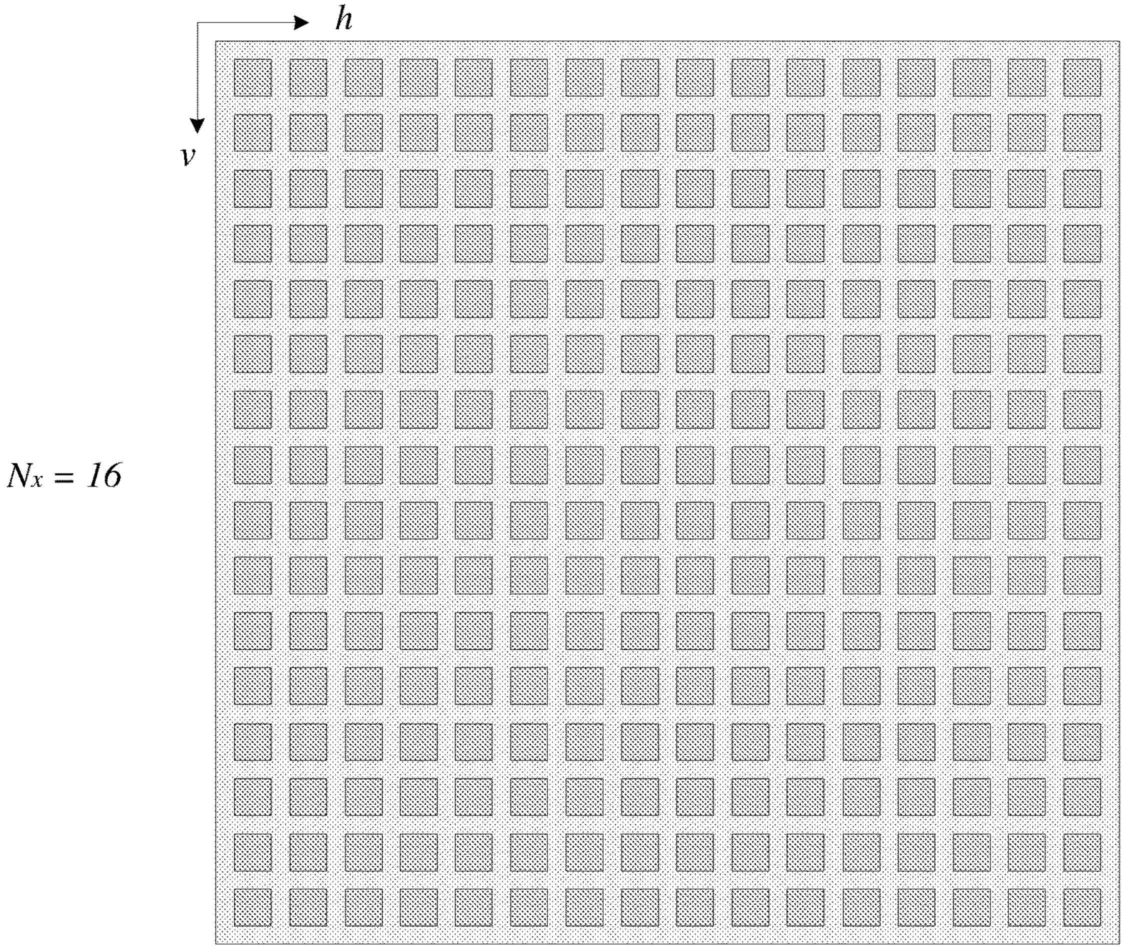
FIG. 2 illustrates a first RIS structure.

FIG. 2 illustrates an example of the first RIS structure. The RIS shown in FIG. 2 is composed of 256 reflective elements with the size of $N_y$=16×$N_x$=16 (where $N_y$ denotes the number of reflective elements in a horizontal direction, and $N_x$ denotes the number of reflective elements in a vertical direction). The reflective element may be abbreviated as "element" hereinafter. Each element is controlled by a PIN diode. Each of the elements can be independently controlled. It means that the reflection coefficient for each element can be selected from 0 or 1 corresponding to "ON" and "OFF" states of the PIN diode. Therefore, the reflection coefficients corresponding to the RIS illustrated in FIG. 2 should be a matrix with size 16 (=$N_y$)×16 (=$N_x$), and the reflection coefficient of each element is a value of 0 or 1. That is, each element can be indicated by 1 (=$\log_2(M)$) bit, where M is equal to the number of possible phase states of each element (or of each PIN diode), i.e. M=2 in the example of the first RIS structure.

The RIS structure shown in FIG. 2 may be adopted in lower frequency band and millimeter wave band with simple implementation. On the other hand, in higher frequency band (including terahertz frequency band), metasurface based RIS may be employed considering the very small RIS elements.

Figure 3:
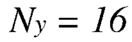
FIG. 3 illustrates a second RIS structure.
Figure 3:
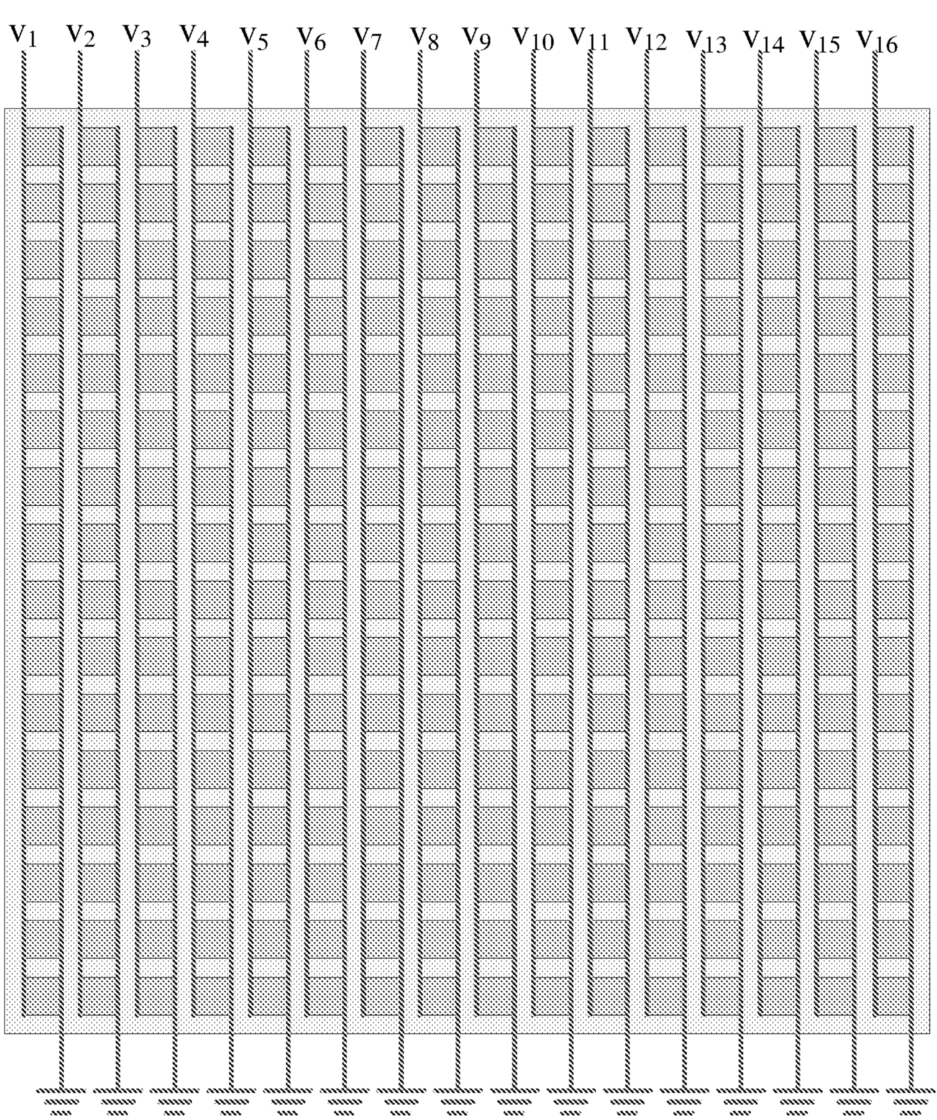

A second RIS structure (e.g. metasurface based RIS) is shown in FIG. 3. For example, the second RIS structure is composed of programmable vanadium dioxide metasurface, where a single type of meta-atom is employed and each meta-atom can be electrically tuned to one of two phase states (e.g., 0 and π) with a phase difference of π. In addition, all the meta-atoms in a vertical direction are (or can be) controlled simultaneously, while the meta-atoms in different columns are independently controlled to generate different beams with different directions. In this situation, the reflection coefficients corresponding to the RIS illustrated in FIG. 3 should be a matrix with size 16 (=$N_y$)×1 (since the reflection coefficient of each element in the same column (i.e. any of $V_1$ to $V_{16}$) is the same), and the reflection coefficient of each element is a value of 0 or 1. Since the reflection coefficients matrix has a size of 16×1, it can be alternatively referred to as "beam steer vector".

In the second RIS structure, each meta-atom can have one of two different phase states, e.g., 0 and π. In order to improve beamforming flexibility, the number of phase states of each meta-atom can be increased.

In a variety of the second RIS structure, each meta-atom type can be electrically tuned to one of four phase states representing e.g. 0, $\pi/2$, $\pi$, and $3\pi/2$, respectively. For example, if the meta-atom type with four phase states is adopted with the second RIS structure illustrated in FIG. 3, the reflection coefficients matrix will have a size 16×1 and the reflection coefficient of each element is a value of 00, 01, 10, or 11. That is, the reflection coefficient of each element can be indicated by 2 (=$\log_2(M)$) bits, where M is equal to the number of possible phase states of each element, i.e. M=4. Similarly, for the first RIS structure illustrated in FIG. 2, each element can also have four phase states (e.g. 0, $\pi/2$, $\pi$, and $3\pi/2$), e.g. by configuring two PIN diodes to control one element. In this condition, the reflection coefficients matrix will have a size of 16×16 and the reflection coefficient of each element is a value of 00, 01, 10, or 11.

Figure 4A:
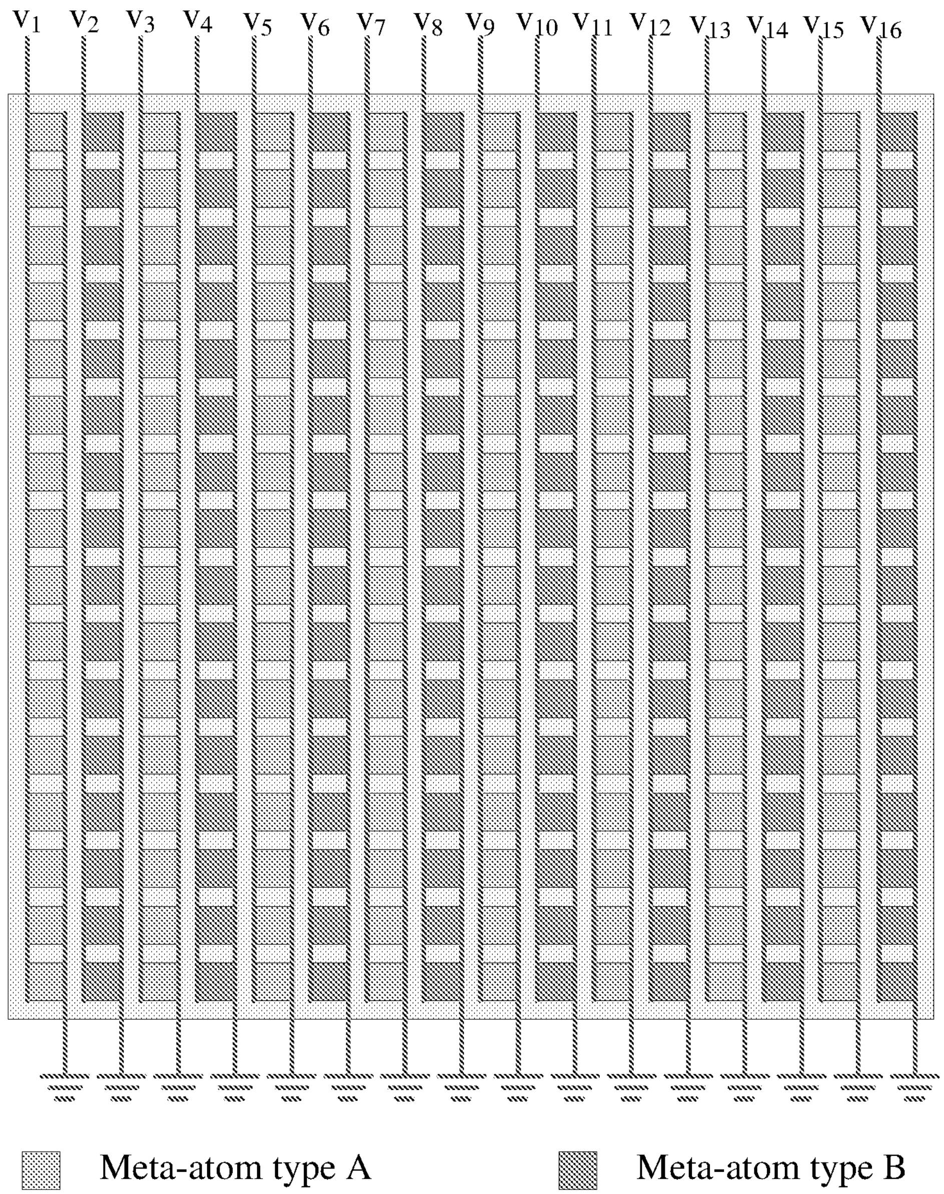
FIGS. 4(*a*) and 4(*b*) illustrate a third RIS structure.
Figure 4B:
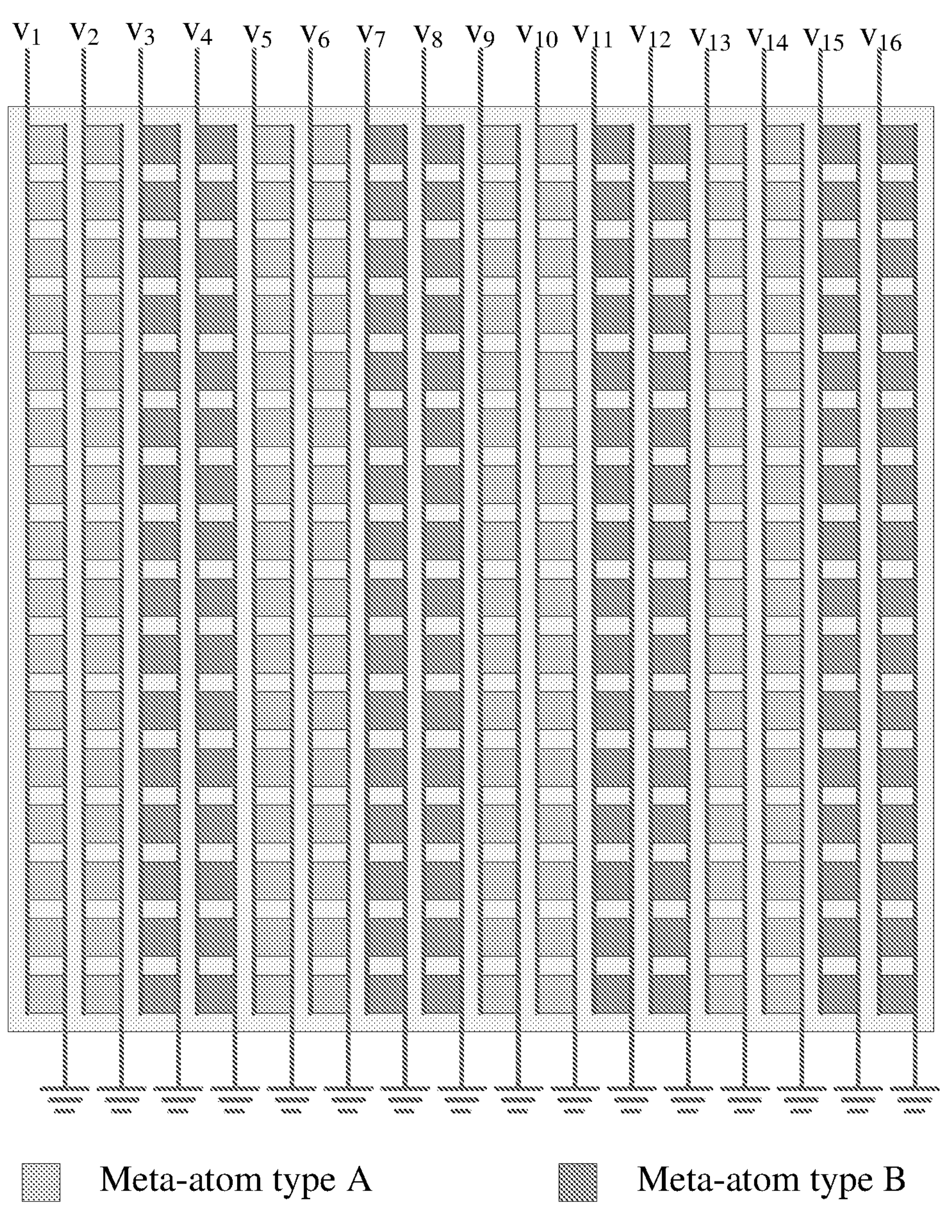

A third RIS structure, e.g., dual meta-atom types based RIS, is illustrated in FIGS. 4(*a*) and 4(*b*). As shown in FIGS. 4(*a*) and 4(*b*), two types of meta-atom, e.g., type A and type B, are employed. Each meta-atom type has two phase states with phase difference of $\pi$ while different types have different initial phases. For example, type A may have an initial phase 0, which means that it can generate two different phase states of 0 and $\pi$. Type B may have an initial phase $\pi/2$, which means that it can generate two different phase states of $\pi/2$ and $3\pi/2$. Accordingly, four different phase states, e.g., $\{0, \pi/2, \pi, 3\pi/2\}$ can be generated by employing dual meta-atom types.

Different meta-atom patterns can be adopted in dual meta-atom types based RIS. For example, each of the reflection coefficients matrix for the RIS structure shown in FIG. 4(*a*) and that for the RIS structure shown in FIG. 4(*b*) will have a size of 16×1 and each element is a value of 0 or 1. However, the meta-atom patterns are different for RIS structures shown in FIG. 4(*a*) and FIG. 4(*b*). For example, the meta-atom pattern for RIS structure shown in FIG. 4(*a*) is {ABABABABABABABAB}, and the meta-atom pattern for RIS structure shown in FIG. 4(*b*) is {AABBAABBAABBAABB}. Depending on different meta-atom patterns, the value of each element (i.e. 0 or 1) of the reflection coefficient matrix indicates different phase states. For example, 0 for type A indicates phase state of 0; 1 for type A indicates phase state of $\pi$; and 0 for type B indicates phase state of $\pi/2$; 1 for type B indicates phase state of $3\pi/2$.

As stated in background part, a typical RIS scenario is that the reflection coefficients matrix is calculated and generated by the base station and is dynamically sent to the RIS device via a dedicated RIS-BS interface. Considering different RIS structures, the base station should know the RIS capability (i.e. RIS parameters) so that reflection coefficients matrix can be generated exactly. Incidentally, the RIS is a part of the RIS device. That is, the RIS device includes the RIS and other necessary components (e.g. RIS's controller).

A second embodiment relates to the RIS capability (or RIS parameters) to be reported by the RIS device.

Based on the above description of different RIS structures, the RIS capability may include the following RIS parameters.

(1) The number of RIS panels adopted by the RIS structure: It is assumed that each RIS panel adopts the same structure, which means that each of the following RIS parameters (2)-(7) for one RIS panel, whether reported or not, is the same for each RIS panel. $N_p$ may denote the number of RIS panels. Incidentally, if the number of RIS panels is a predetermined fixed number (e.g. 1), it is not necessary to report the number of RIS panels.

(2) The number of RIS elements in a vertical direction and in a horizontal direction in one RIS panel: $N_x$ may denote the number of elements in the horizontal direction (e.g. $N_x$=16 in FIG. 2), and $N_y$ may denote the number of elements in the vertical direction (e.g. $N_y$=16 in FIG. 2).

(3) The number of phase states for each element (e.g. the number of phase states that can be generated by each meta-atom): The number of phase states may be two (e.g. 0 and $\pi$ represented by 0 and 1) or four (e.g. 0, $\pi/2$, $\pi$ and $3\pi/2$ represented by 00, 01, 10, and 11). $N_s$ may denote the number of phase states. Incidentally, if the number of phase states is a predetermined fixed number (e.g. 2), it is not necessary to report the number of phase states. The number of bits (denoted as N) for indicating the reflection coefficient of each element is dependent on the number of phase states (denoted as M) for each element. In particular, N=$\log_2(M)$. Note that it is assumed that M is one of 2, 4, 8, 16, . . . so that $\log_2(M)$ is an integer. If $\log_2(M)$ is not an integer, then N=roundup ($\log_2(M)$), i.e. the smallest integer that is equal to or larger than $\log_2(M)$.

(4) Whether the phase states of all elements (e.g. all meta atoms) in each column can be controlled together: For example, I=0 may indicate that the phase state of all elements of each column cannot be controlled together (e.g., each meta-atom in a column can be independently controlled). I=1 may indicate that the phase state of all elements of each column are controlled together (e.g. the phase state of all meta-atoms in each column is always configured to the same value).

(5) Whether dual meta-atom types are adopted by the RIS structure. For example, D=0 may indicate that dual meta-atom types are not adopted. D=1 may indicate that dual meta-atom types are adopted. Incidentally, if dual meta-atom types are not supported, it is not necessary to report whether dual meta-atom types are adopted by the RIS structure When whether dual meta-atom types are adopted by the RIS structure is reported as dual meta-atom types are adopted (e.g. D=1), it is assumed that each meta-atom type can generate two phase states. In addition, the phase difference is assumed to be 180° (i.e. $\pi$). It means that the phase difference between power on and power off is 180° (i.e. $\pi$). In the condition that dual meta-atom types are adopted (e.g. D=1), the initial phase of each meta-atom type before phase change, and the meta-atom pattern of each RIS panel are necessary to be reported.

(6) The initial phase of each meta-atom type before phase change may be a or $\alpha+\pi/2$ and $\alpha$ may be arbitrary angle, e.g. $\alpha$=0 in the third RIS structure. Accordingly, the phase of each meta-atom type after phase change may be $\alpha+\pi$ or $\alpha+3\pi/2$. Accordingly, four different phases (e.g. $\alpha$, $\alpha+\pi/2$, $\alpha+\pi$, and $\alpha+3\pi/2$) can be achieved by using two meta-atom types (e.g. type A and type B) with different initial phases, although each of the two meta-atom types can only generate two phase states.

(7) The meta-atom pattern of each RIS panel refers to the meta-atom type (e.g. type A or type B) adopted in each column, where all elements, i.e., meta-atoms, in one column adopt the same meta-atom type. For example, for the RIS structure shown in FIG. 4(*a*), the meta-atom pattern is {ABABABABABABABAB}. For the RIS structure shown in FIG. 4(*b*), the meta-atom pattern is {AABBAABBAABBAABB}.

When the RIS device reports the RIS capability (or RIS parameters) to the base station (e.g. gNB), the base station can derive exact reflection coefficients for all of elements of the RIS based on the reported RIS capability (or reported RIS parameters). The reflection coefficients for all of elements of the RIS device are referred to as "reflection coefficients matrix", which can be alternatively referred to as "beam steer matrix" or "beam steer vector" (e.g. when the phase states of each column can be controlled together).

The reflection coefficients matrix derived by the base station can be transmitted to the RIS via a dedicated interface between the base station and the RIS device.

Figure 5:
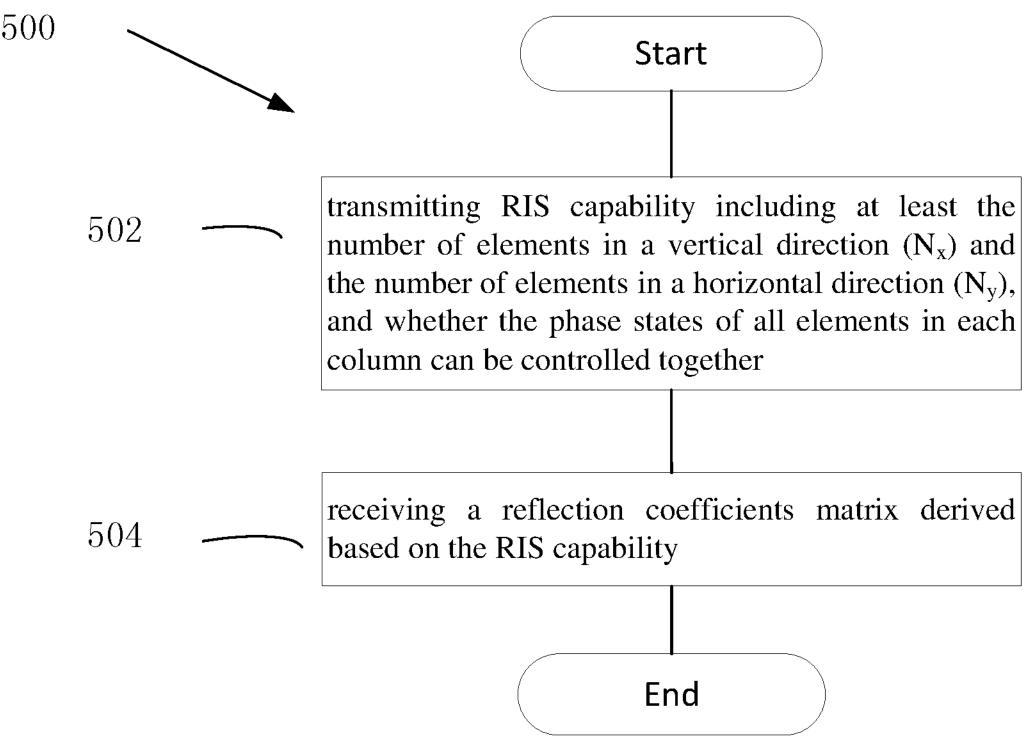
FIG. 5 is a schematic flow chart diagram illustrating an embodiment of a method.

FIG. 5 is a schematic flow chart diagram illustrating an embodiment of a method 500 according to the present application. In some embodiments, the method 500 is performed by an apparatus, such as an RIS device. In certain embodiments, the method 500 may be performed by a processor executing program code, for example, a microcontroller, a microprocessor, a CPU, a GPU, an auxiliary processing unit, a FPGA, or the like.

The method 500 may include 502 transmitting RIS capability including at least the number of elements in a vertical direction ($N_x$) and the number of elements in a horizontal direction ($N_y$), and whether the phase states of all elements in each column can be controlled together; and 504 receiving a reflection coefficients matrix derived based on the RIS capability.

When the phase states of all elements in each column can be controlled together, the reflection coefficients matrix has a size of $N_y \times 1$, and when the phase states of all elements in each column can be controlled independently, the reflection coefficients matrix has a size of $N_y \times N_x$.

The RIS capability may further include the number of phase states of each element (M); and each reflection coefficient in the reflection coefficients matrix has N bit(s), where $N = \log_2(M)$.

The RIS capability may further include the number of RIS panels, and each RIS panel has the same structure.

The RIS capability may further include whether dual meta-atom types are adopted. In particular, when the dual meta-atom types are adopted, the RIS capability further includes the initial phase of each meta-atom type before phase change, and a meta-atom pattern.

Figure 6:
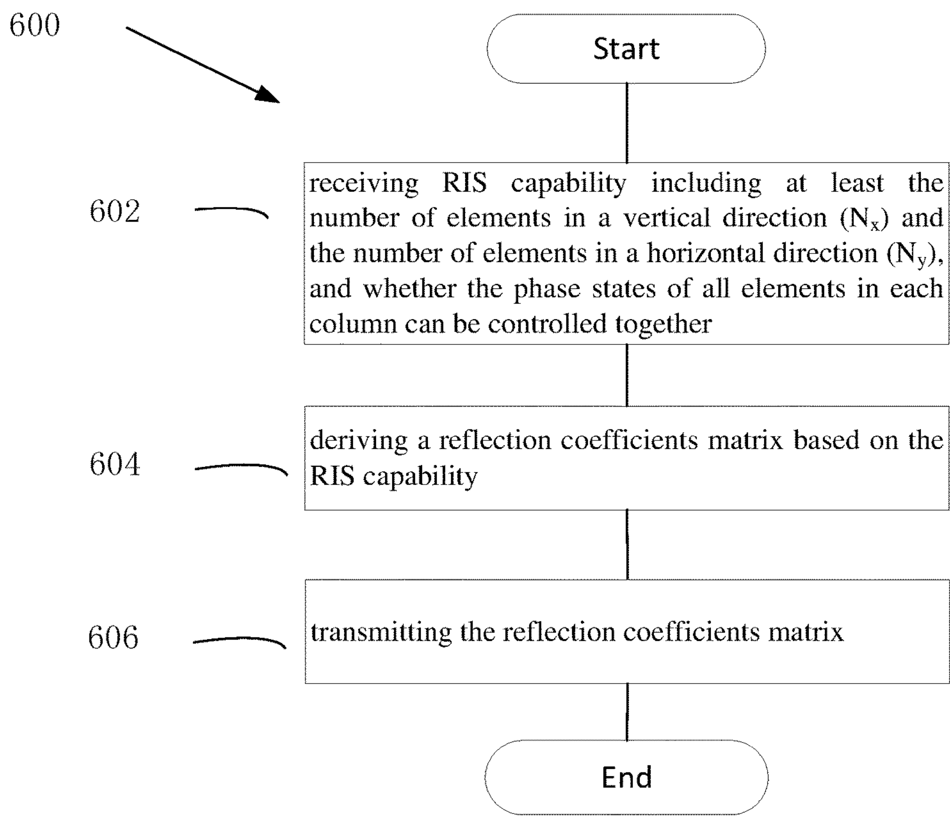
FIG. 6 is a schematic flow chart diagram illustrating a further embodiment of a method.

FIG. 6 is a schematic flow chart diagram illustrating a further embodiment of a method 600 according to the present application. In some embodiments, the method 600 is performed by an apparatus, such as a base station. In certain embodiments, the method 600 may be performed by a processor executing program code, for example, a microcontroller, a microprocessor, a CPU, a GPU, an auxiliary processing unit, a FPGA, or the like.

The method 600 may include 602 receiving RIS capability including at least the number of elements in a vertical direction ($N_x$) and the number of elements in a horizontal direction ($N_y$), and whether the phase states of all elements in each column can be controlled together; 604 deriving a reflection coefficients matrix based on the RIS capability; and 606 transmitting the reflection coefficients matrix.

When the phase states of all elements in each column can be controlled together, the reflection coefficients matrix has a size of $N_y \times 1$, and when the phase states of all elements in each column can be controlled independently, the reflection coefficients matrix has a size of $N_y \times N_x$.

The RIS capability may further include the number of phase states of each element (M); and each reflection coefficient in the reflection coefficients matrix has N bit(s), where $N = \log_2(M)$.

The RIS capability may further include the number of RIS panels, and each RIS panel has the same structure.

The RIS capability may further include whether dual meta-atom types are adopted. In particular, when the dual meta-atom types are adopted, the RIS capability further includes the initial phase of each meta-atom type before phase change, and a meta-atom pattern.

Figure 7:
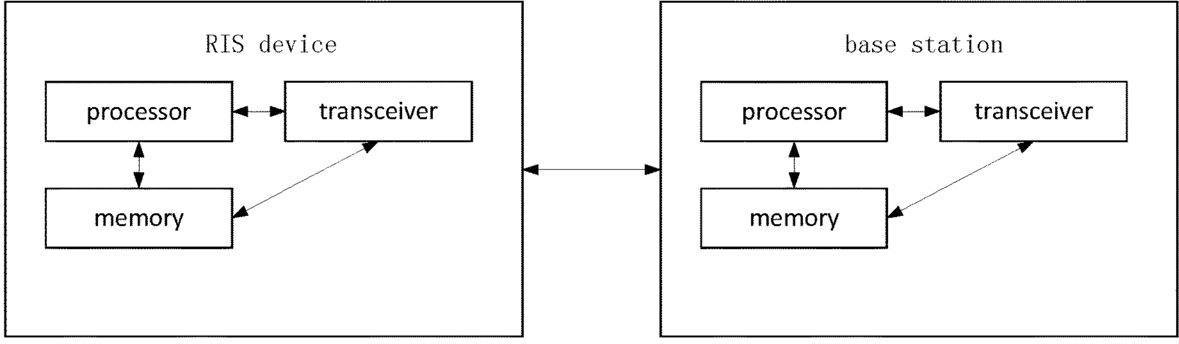
FIG. 7 is a schematic block diagram illustrating apparatuses according to one embodiment.

FIG. 7 is a schematic block diagram illustrating apparatuses according to one embodiment.

Referring to FIG. 7, the RIS device includes a processor, a memory, and a transceiver. The processor implements a function, a process, and/or a method which are proposed in FIG. 5.

The RIS device comprises a transmitter that transmits RIS capability including at least the number of elements in a vertical direction ($N_x$) and the number of elements in a horizontal direction ($N_y$), and whether the phase states of all elements in each column can be controlled together; and a receiver that receives a reflection coefficients matrix derived based on the RIS capability.

When the phase states of all elements in each column can be controlled together, the reflection coefficients matrix has a size of $N_y \times 1$, and when the phase states of all elements in each column can be controlled independently, the reflection coefficients matrix has a size of $N_y \times N_x$.

The RIS capability may further include the number of phase states of each element (M); and each reflection coefficient in the reflection coefficients matrix has N bit(s), where $N = \log_2(M)$.

The RIS capability may further include the number of RIS panels, and each RIS panel has the same structure.

The RIS capability may further include whether dual meta-atom types are adopted. In particular, when the dual meta-atom types are adopted, the RIS capability further includes the initial phase of each meta-atom type before phase change, and a meta-atom pattern.

Referring to FIG. 7, the base station includes a processor, a memory, and a transceiver. The processors implement a function, a process, and/or a method which are proposed in FIG. 6.

The base station comprises a receiver that receives RIS capability including at least the number of elements in a vertical direction ($N_x$) and the number of elements in a horizontal direction ($N_y$), and whether the phase states of all elements in each column can be controlled together; a processor that derives a reflection coefficients matrix based on the RIS capability; and a transmitter that transmits the reflection coefficients matrix.

When the phase states of all elements in each column can be controlled together, the reflection coefficients matrix has a size of $N_y \times 1$, and when the phase states of all elements in each column can be controlled independently, the reflection coefficients matrix has a size of $N_y \times N_x$.

The RIS capability may further include the number of phase states of each element (M); and each reflection coefficient in the reflection coefficients matrix has N bit(s), where $N = \log_2(M)$.

The RIS capability may further include the number of RIS panels, and each RIS panel has the same structure.

The RIS capability may further include whether dual meta-atom types are adopted. In particular, when the dual meta-atom types are adopted, the RIS capability further includes the initial phase of each meta-atom type before phase change, and a meta-atom pattern.

Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a Reconfigurable Intelligent Surface (RIS) device, the method comprising:

transmitting RIS capability including at least a number of elements in a vertical direction ($N_x$) and a number of elements in a horizontal direction ($N_y$), and whether phase states of all elements in each column can be controlled together; and receiving a reflection coefficients matrix derived based on the RIS capability, wherein, when the phase states of all elements in each column can be controlled together, the reflection coefficients matrix has a size of $N_y \times 1$, and when the phase states of all elements in each column can be controlled independently, the reflection coefficients matrix has a size of $N_y \times N_x$.

2. The method of claim 1, wherein;

the RIS capability further includes a number of phase states of each element (M); and each reflection coefficient in the reflection coefficients matrix has N bit(s), where $N=\log_2(M)$.

3. The method of claim 1, wherein the RIS capability further includes a number of RIS panels, and each RIS panel has a same structure.

4. The method of claim 1, wherein the RIS capability further includes whether dual meta-atom types are adopted.

5. The method of claim 4, wherein, when the dual meta-atom types are adopted, the RIS capability further includes an initial phase of each meta-atom type before phase change, and a meta-atom pattern.

6. A Reconfigurable Intelligent Surface (RIS) device, comprising:

at least one memory; and at least one processor coupled with the at least one memory and configured to cause the RIS to:

transmit RIS capability including at least a number of elements in a vertical direction ($N_x$) and a number of elements in a horizontal direction ($N_y$), and whether phase states of all elements in each column can be controlled together; and receive a reflection coefficients matrix derived based on the RIS capability, wherein, when the phase states of all elements in each column can be controlled together, the reflection coefficients matrix has a size of $N_y \times 1$, and when the phase states of all elements in each column can be controlled independently, the reflection coefficients matrix has a size of $N_y \times N_x$.

7. The RIS device of claim 6, wherein:

the RIS capability further includes a number of phase states of each element (M); and each reflection coefficient in the reflection coefficients matrix has N bit(s), where $N=\log_2(M)$.

8. The RIS device of claim 6, wherein the RIS capability further includes a number of RIS panels, and each RIS panel has a same structure.

9. The RIS device of claim 6, wherein the RIS capability further includes whether dual meta-atom types are adopted.

10. The RIS device of claim 9, wherein, when the dual meta-atom types are adopted, the RIS capability further includes an initial phase of each meta-atom type before phase change, and a meta-atom pattern.

11. A method performed by a base station, the method comprising:

receiving Reconfigurable Intelligent Surface (RIS) capability including at least a number of elements in a vertical direction ($N_x$) and a number of elements in a horizontal direction ($N_y$), and whether phase states of all elements in each column can be controlled together;

deriving a reflection coefficients matrix based on the RIS capability, wherein, when the phase states of all elements in each column can be controlled together, the reflection coefficients matrix has a size of $N_y \times 1$, and when the phase states of all elements in each column can be controlled independently, the reflection coefficients matrix has a size of $N_y \times N_x$; and transmitting the reflection coefficients matrix.

12. A base station for wireless communication, comprising:

at least one memory; and at least one processor coupled with the at least one memory and configured to cause the base station to:

receive Reconfigurable Intelligent Surface (RIS) capability including at least a number of elements in a vertical direction ($N_x$) and a number of elements in a horizontal direction ($N_y$), and whether phase states of all elements in each column can be controlled together;

derive a reflection coefficients matrix based on the RIS capability, wherein, when the phase states of all elements in each column are controlled together, the reflection coefficients matrix has a size of $N_y \times 1$, and when the phase states of all elements in each column are controlled independently, the reflection coefficients matrix has a size of $N_y \times N_x$; and transmit the reflection coefficients matrix.

13. The base station of claim 12, wherein:

the RIS capability further includes a number of phase states of each element (M); and each reflection coefficient in the reflection coefficients matrix has N bit(s), where $N=\log_2(M)$.

14. The base station of claim 12, wherein the RIS capability further includes 1 number of RIS panels, and each RIS panel has a same structure.

15. The base station of claim 12, wherein the RIS capability further includes whether dual meta-atom types are adopted.

16. The base station of claim 15, wherein, when the dual meta-atom types are adopted, the RIS capability further includes an initial phase of each meta-atom type before phase change, and a meta-atom pattern.

* * * * *